(12) United States Patent
Kim et al.

(10) Patent No.: US 6,940,565 B2
(45) Date of Patent: Sep. 6, 2005

(54) LIQUID CRYSTAL DISPLAY DEVICE AND FABRICATING METHOD THEREOF

(75) Inventors: Jeong Hyun Kim, Kunpo-shi (KR); Hyun Sik Seo, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 124 days.

(21) Appl. No.: 09/893,965

(22) Filed: Jun. 29, 2001

(65) Prior Publication Data

US 2002/0044243 A1 Apr. 18, 2002

(30) Foreign Application Priority Data

Dec. 28, 2000 (KR) .......................................... 2000-84093

(51) Int. Cl.⁷ ................................................ G02F 1/136
(52) U.S. Cl. .......................... 349/42; 349/41; 349/47; 349/143
(58) Field of Search ................................. 349/143, 138, 349/139, 140, 41, 42, 47; 257/72, 347; 438/158, 159

(56) References Cited

U.S. PATENT DOCUMENTS

| | | | |
|---|---|---|---|
| 4,325,987 A | | 4/1982 | Kalbskopf et al. |
| 4,888,210 A | | 12/1989 | Isozaki et al. |
| 5,986,724 A | * | 11/1999 | Akiyama et al. ............. 349/41 |
| 6,011,274 A | * | 1/2000 | Gu et al. ...................... 257/59 |
| 6,038,008 A | * | 3/2000 | Kim et al. .................... 349/138 |
| 6,359,586 B1 | * | 3/2002 | Sviestins ...................... 438/149 |
| 6,556,271 B1 | * | 4/2003 | Tsujimura et al. ........... 349/187 |

FOREIGN PATENT DOCUMENTS

KR 2002071643 A * 9/2002 ............ G02F/1/136

OTHER PUBLICATIONS

Orgacon™ Conductive Transparent Films, Product Information. "Patterning Orgacon™ Film by means of UV lithography", revised 4/200, pp 1–6.

PEDOT, Product Information, "PEDOT Coating Solutions and Screen Printing Pastes Product in development," revised May 2000, 3 pages.

Orgacon™ EL: an economic alternative to ITO in Thick Film Electroluminescent Lamp and Display production, 6 pages.

Orgacon™ Conductive Transparent Films, Product Information , "Patterning Orgacon™ Film by screen–printing–mast based approach," revised Apr. 2000 pp. 1–2.

Glasslaminates, Product Information, "Thin glass/film laminates Product in development," revised Apr. 2000, pp. 1–2.

* cited by examiner

Primary Examiner—George Eckert
Assistant Examiner—Edgardo Ortiz
(74) Attorney, Agent, or Firm—McKenna Long & Aldridge LLP (57) ABSTRACT

A liquid crystal display device, and a fabricating method thereof, having organic pixel electrodes. The organic pixel electrodes are beneficially comprised of a light sensitive organic material, preferably PEDOT (polyethylenedioxythiophene). The organic pixel electrodes are rendered electrically conductive using light. The method of fabricating a liquid crystal display device coating or screen printing a TFT substrate with the light sensitive organic material, and then illuminating selected portions of the light sensitive material to form the organic pixel electrodes.

17 Claims, 7 Drawing Sheets

LIQUID CRYSTAL DISPLAY DEVICE AND FABRICATING METHOD THEREOF

This application claims the benefit of Korean Patent Application No. 2000-84093 filed on Dec. 28, 2000, which is hereby incorporated by reference as if fully set forth herein.

BACKGROUND OF THE INVENTION

1. Field of the Invention

The present invention relates to a liquid crystal display device and to its fabricating method.

2. Background of the Related Art

Generally, a liquid crystal display device (hereinafter abbreviated LCD) includes a pair of glass substrates and an interposed liquid crystal that is sealed between those substrates. A TFT-LCD is an LCD device that includes thin film transistors (hereinafter abbreviated TFT) as switching elements that selectively applying signals across the liquid crystal. Thus, a TFT-LCD includes a TFT substrate with thin film transistors, a color filter substrate having color filters, and a liquid crystal between the TFT and color filter substrates. A TFT-LCD produces an image using the electro-optical characteristics of the liquid crystal.

Because TFT-LCDs have the benefits of low power consumption, lightweight, and portability, they hold the promise of being the next generation of imaging devices.

Figure 1:
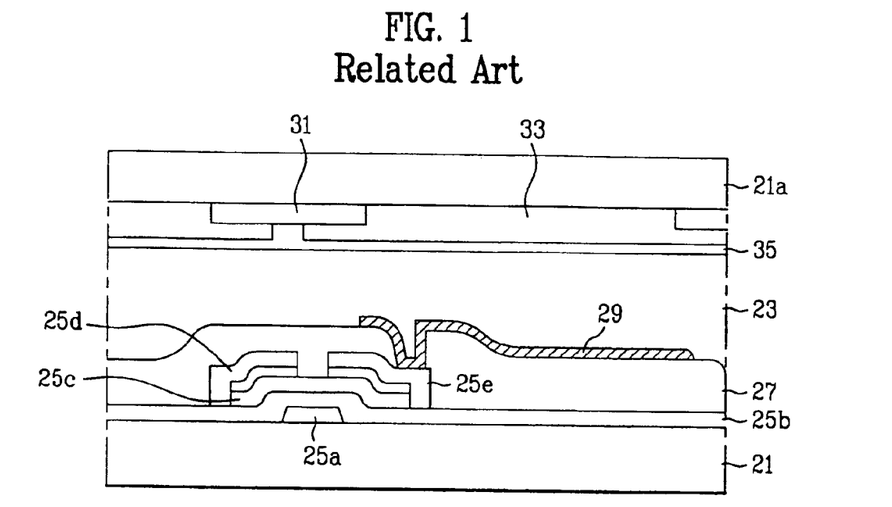
FIG. 1 shows a cross-sectional view of an LCD according to a related art.

Reference will now be made in detail to an LCD according to the related art. Referring to FIG. 1, such an LCD includes a lower glass substrate 21, an upper glass substrate 21a, and a liquid crystal layer 23 between the substrates 21 and 21a. A plurality of crossing gate lines and data lines are formed on the lower glass substrate 21. A TFT is arranged near each intersection of the gate and data lines.

The TFT includes a gate electrode 25a on the lower glass substrate 21, a gate insulating layer 25b over the lower glass substrate 21 and the gate electrode 25a, and a semiconductor layer 25c on the gate insulating layer 25b and over the gate electrode 25a. The semiconductor layer acts as a TFT channel. A source electrode 25d and a drain electrode 25e are on the semiconductor layer 25c. A passivation layer 27 extends over the source electrode 25d, over the drain electrode 25e, over a portion of the semiconductor layer 25c, and over the gate insulating layer 25b. A pixel electrode 29 is disposed on the passivation layer 27 and in electrical contact with the drain electrode 25e.

On the upper glass substrate 21 is a black matrix 31 arranged in a pattern to block light, except through the pixel electrode 29. The upper glass substrate 21 also includes color filters 33, which include red, green, and blue filters. A common electrode 35 is over the black matrix 31 and over the color filters 33. A voltage applied between the pixel electrode 29 and the common electrode produces an electric field in the liquid crystals 23. An overcoat layer (not shown in the drawings) may be added to protect and planarize surfaces before the common electrode 35 is formed.

Figure 2A:
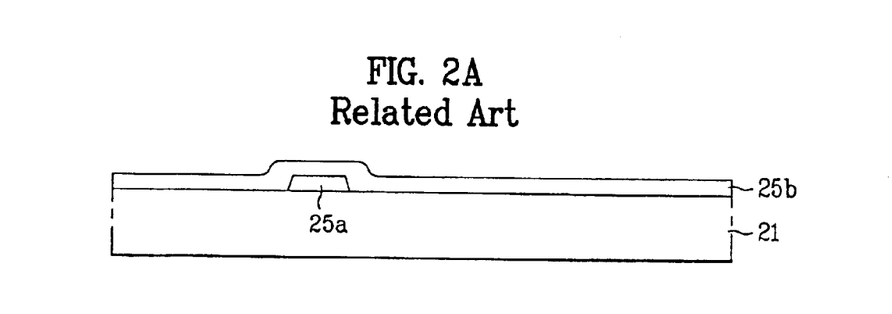
FIG. 2A to FIG. 2E show cross-sectional views when fabricating an LCD according to a related art.

FIG. 2A to FIG. 2E show cross-sectional views during fabrication of a related art LCD. Referring now to FIG. 2A, a metal layer is formed on a lower glass substrate 21 by depositing Al, Cr, Mo, Cu, Al alloy or the like, beneficially by sputtering. A gate line and a gate electrode 25a (see FIG. 2E) that extends from the gate line is formed from the metal layer by photolithography.

Then, a gate insulating layer 25b is formed on the lower glass substrate 21, including on the gate electrode 25a, using plasma enhanced chemical vapor deposition of silicon oxide ($SiO_x$), silicon nitride ($SiN_x$), or the like.

Figure 2B:
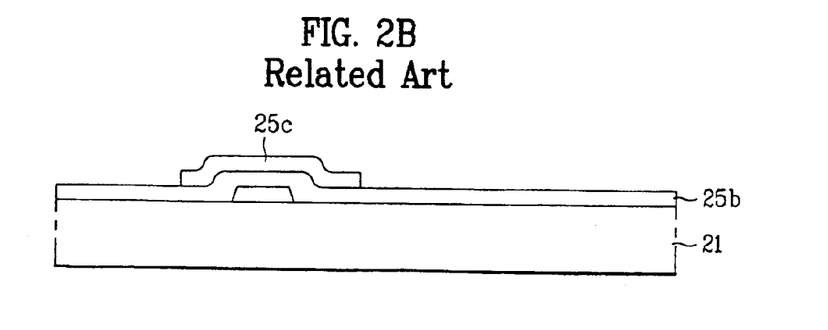

Referring now to FIG. 2B, a silicon layer is then formed on the gate insulating layer 25b by depositing amorphous silicon or the like. Then, a semiconductor layer 25c for the TFT channel is formed by patterning the silicon layer such that the silicon remains over the gate electrode 25a.

Figure 2C:
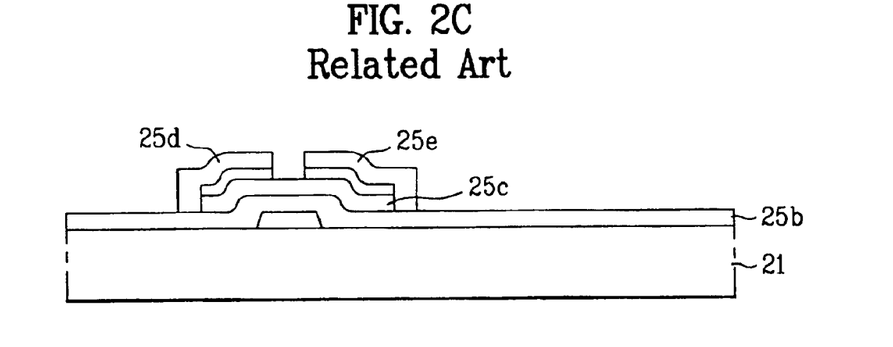

Referring now to FIG. 2C, a metal layer is formed over the exposed surfaces, including over the semiconductor layer 25c, by depositing Al, Cr, Mo, Cu, an Al alloy, or the like by sputtering. Then, a data line that crosses the gate line, and source and drain electrodes 25d and 25e that extend from the data line are formed from the metal layer by photolithography.

Figure 2D:
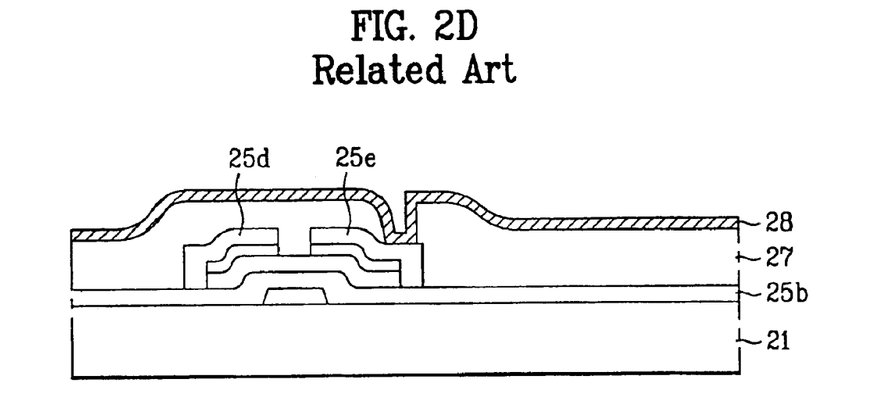

Referring now to FIG. 2D, a passivation layer 27 is then formed over the exposed surfaces, including over the source and drain electrodes 25d and 25e. The passivation layer 27 is beneficially silicon nitride, silicon oxide, BCB or the like. A contact hole is then formed by selectively removing a portion of the passivation layer 27 to expose a portion of the drain electrode 25e. An ITO (indium tin oxide) layer 28 is then formed on an exposed surfaces, including in the contact hole, by sputtering.

Figure 2E:
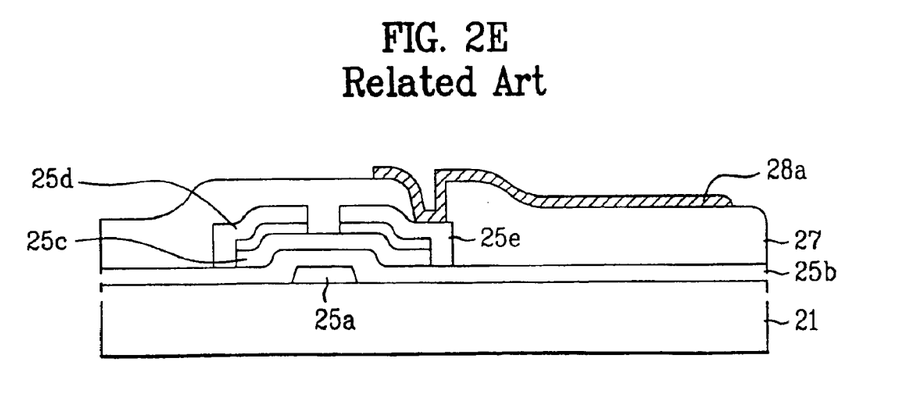

Referring now to FIG. 2E, a pixel electrode 28a is then formed by removing a portion of the ITO layer 28 using photolithography, beneficially using an etchant belonging to the $FeCl_3$ or the ($HNO_3$+HCl) family.

After the TFT substrate is completed, that substrate is combined with a color filter substrate. Subsequently, a liquid crystal is interposed between the thin film transistor and the color filter substrates, thereby completing an LCD according to the related art.

Unfortunately, the related art LCD and its fabrication method has problems. The pixel electrode is patterned by etching an ITO layer using an $FeCl_3$ or an ($HNO_3$+HCl) family etchant. Such etchants can produce a metal oxide layer, or the pixel electrode pattern can be damaged, when a line (gate or data) metal of Al, Cu, or the like is contacted by the ITO etchant, which also contacts the ITO. Contact resistance can be increased, signals can be delayed, and electric shorts can result. Additionally, ITO is deposited in a sputtering device that includes very expensive vacuum equipment. Furthermore, the sputtering process temperature tends to be very high.

SUMMARY OF THE INVENTION

Accordingly, the present invention is directed to a liquid crystal display device, and to its fabricating method, that substantially obviates one or more of the problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purposes of the present invention as embodied and broadly described, a liquid crystal display device includes a first substrate, a second substrate, a plurality of switching elements arranged on the first substrate, a plurality of organic pixel electrodes receiving data signals through the switching elements, and a liquid crystal between the first and second substrates.

In another aspect, a liquid crystal display device according to the present invention includes a TFT substrate having an active area, a pad area, a gate line and a crossing data line that are arranged to define a pixel, a thin film transistor adjacent the crossing, a passivation layer on the thin film transistor and having a contact hole, and an organic pixel electrode formed in the pixel area and connected to the thin film transistor through the contact hole.

In a further aspect, a method of fabricating a liquid crystal display device according to the present invention includes the steps of preparing a first substrate and a second substrate, forming a plurality of thin film transistors on the first substrate, forming a passivation layer over an exposed surface that includes the thin film transistors, forming a plurality of organic pixel electrodes on the passivation layer and that connect to electrodes of the thin film transistors, and locating a liquid crystal between the first and second substrates.

In a further aspect, a method of fabricating a liquid crystal display device includes arranging a gate line and a crossing data line on a TFT substrate, forming a thin film transistor at the crossing, forming a passivation layer over an exposed surface that includes the thin film transistor, and forming an organic pixel electrode that is electrically connected to the thin film transistor through the passivation layer.

An advantage of the present invention is a pixel electrode that when formed causes no damage to the data and gate lines, thereby improving fabrication yield.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and which are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

In the present invention, it is intended that a pixel electrode is formed of organic materials, such as PEDOT and the like, instead of nonorganic materials such as ITO.

When a pixel electrode is formed of ITO, at least part of the fabricating process should be carried out in a vacuum chamber. Furthermore, an etching step is required. However, an organic pixel electrode according to the principles of the present invention is formed by coating a substrate's exposed surfaces with an organic material (such as PEDOT), and then selectively illuminating that organic material where an electrically-conductive pixel electrode is to be formed. Thus, the present invention does not require a vacuum chamber or an etch step when forming the pixel electrodes. Therefore, the present invention does not induce damage on an existing metal layer, such as that which might result from etching.

Reference will now be made in detail to the illustrated embodiments of the present invention, examples of which are shown in the accompanying drawings. Where possible, the same reference numerals will be used to illustrate like elements throughout the specification.

Figure 3:
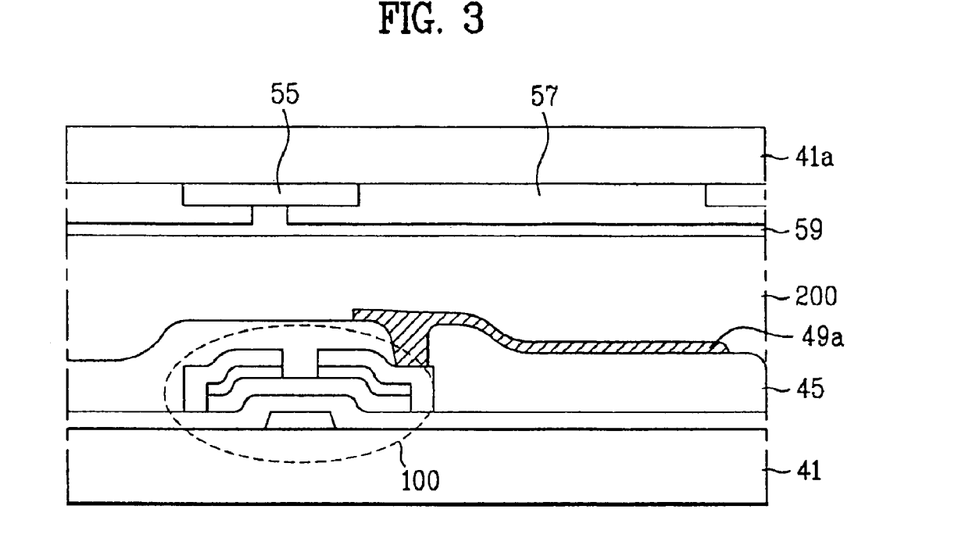
FIG. 3 shows a cross-sectional view of an LCD according to the principles of the present invention.

FIG. 3 shows a cross-sectional view of an LCD that is in accord with the principles of the present invention. Referring to FIG. 3, such an LCD includes a first substrate 41, a confronting second substrate 41a, and a liquid crystal layer 200 between the first and second substrates 41 and 41a.

The first substrate 41 includes a gate line and a crossing data line, a switching element 100 formed adjacent the crossing of the gate and data lines, a passivation layer 45 formed over the gate line and the data line and over the switching element 100. Additionally, the first substrate 41 also includes an organic pixel electrode 49a that connects to an electrode of the switching element 100. Beneficially, the switching element 100 is an a-Si:H thin film transistor or a poly-Si thin film transistor that is structurally formed as a BCE (back channel etch) type thin film transistor, an etch-stopper type thin film transistor, a staggered type thin film transistor, or the like.

While not shown in the drawings, a pad part is formed on the first substrate to assist the transfer of external signals to the respective pixels from external driver circuitry. The pad part includes a gate pad at an end of the gate line, a data pad at an end of the data line, and an organic conductive layer formed on the gate and data pads.

The organic pixel electrode 49a and the organic conductive layer are beneficially formed of PEDOT (polyethylenedioxythiophene), an organic polymer material, that is placed on the substrate 41 by coating or screen printing. Typically, ITO was used for the pixel electrodes. ITO pixel electrodes are formed in a vacuum chamber, usually by sputtering. Sputter forming, and vacuum depositing ITO results in low productivity and are not suitable for wide area coatings.

When a pixel electrode is formed from ITO, the ITO is usually etched by an etchant belonging to the $FeCl_3$ or the ($HNO_3$+HCl) families. In such cases the etchant can cause damage to the metal used for the data and gate lines. On the contrary, the present invention does not require etching, and thus avoids damaging the data and gate lines.

While unexposed PEDOT is non-conductive, where PEDOT is exposed to light it becomes electrically conductive. Thus, the present invention enables the formation of pixel electrodes using light exposure.

Referring now back to FIG. 3, the second substrate 41a includes a black matrix 55, a color filter pattern 57, and a common electrode 59.

Figure 4A:
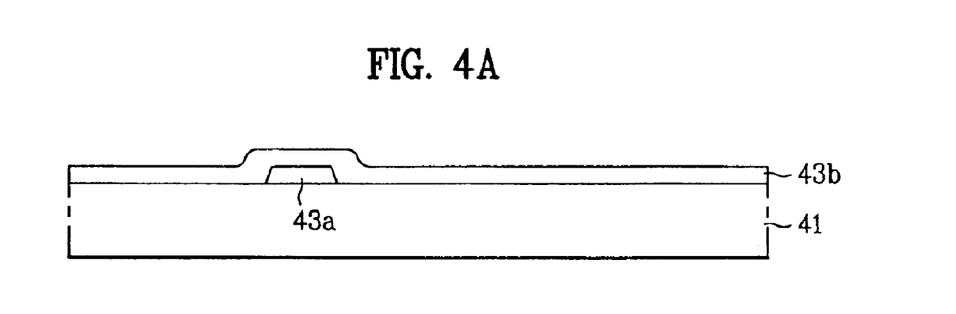
FIG. 4A to FIG. 4E show cross-sectional views when fabricating an LCD according to the principles of the present invention.

FIG. 4A to FIG. 4E illustrate cross-sectional views when fabricating an LCD according to the principles of the present invention. Referring now to FIG. 4A, a metal layer is formed on a first substrate 41 by depositing Al, Cr, Mo, Cu, Al alloy or the like by sputtering. That metal layer is then patterned to form a gate pattern comprising a gate line, a gate electrode 43a, and a gate pad using photolithography.

Then, a gate insulating layer 43b is formed over the first substrate 41 and over the gate pattern by PECVD (plasma enhanced chemical vapor deposition) using silicon oxide ($SiO_x$), silicon nitride ($SiN_x$) or the like.

Figure 4B:
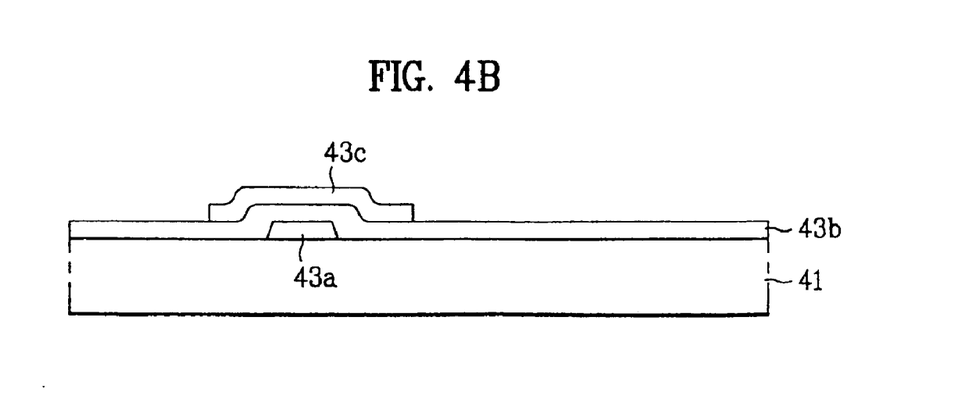

Referring now to FIG. 4B, a silicon layer is then formed over the exposed surfaces, including over the gate insulating layer 43b, by depositing amorphous silicon or the like. A semiconductor layer 43c for a thin film transistor channel is then formed by patterning the silicon layer so as to remain on the gate insulating layer 43b and over the gate electrode 43a. A typical semiconductor layer 43c is formed of a-Si:H or polysilicon.

Figure 4C:
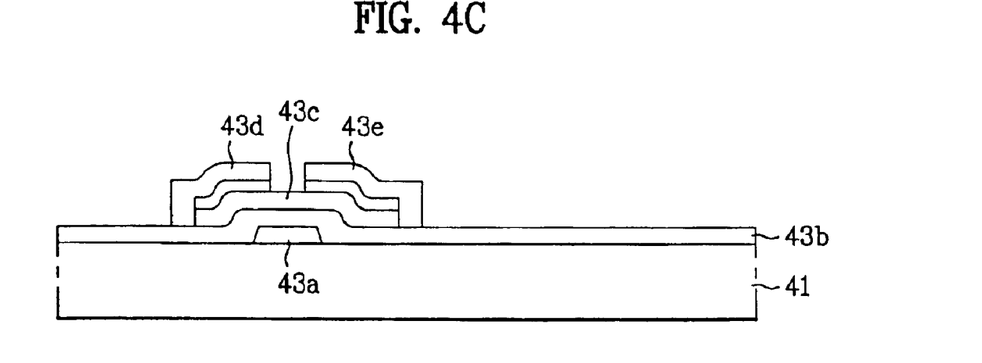

Referring now to FIG. 4C, a metal layer is then formed over the exposed surfaces of the first substrate 41, including over the semiconductor layer 45c, by depositing Al, Cr, Mo, Cu, an Al alloy or the like by sputtering. That metal layer is then patterned by photolithography to form a data pattern comprised of a data line, a source electrode 43d, a drain electrode 43e, and a data pad. "

Figure 4D:
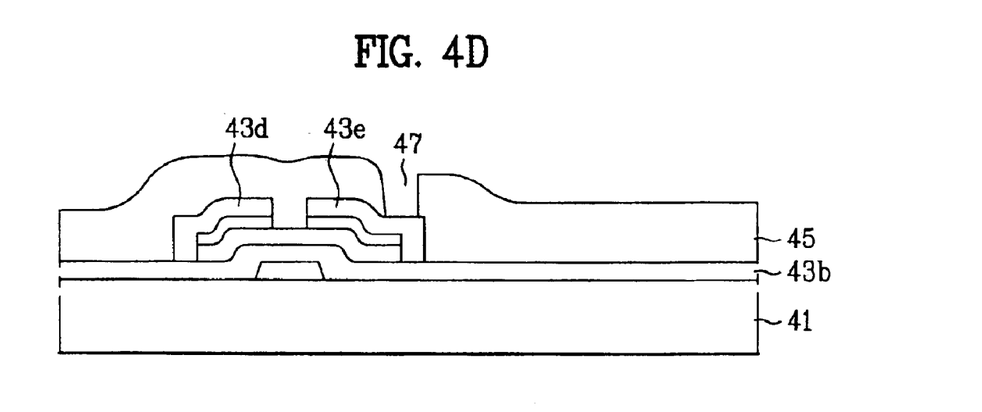

Referring now to FIG. 4D, a passivation layer 45 is then formed over the exposed surfaces of the first substrate, including over the data pattern. That passivation layer is beneficially comprised of an organic material such as acryl, BCB (benzocyclobutene), or the like, or an inorganic material such as silicon nitride, silicon oxide, or the like. A contact hole 47 is then formed by selectively removing a portion of the passivation layer 45 so as to expose a portion of the drain electrode 43e. Additionally, the passivation layer 45 is removed from over the gate pad and the data pad."

Figure 4E:
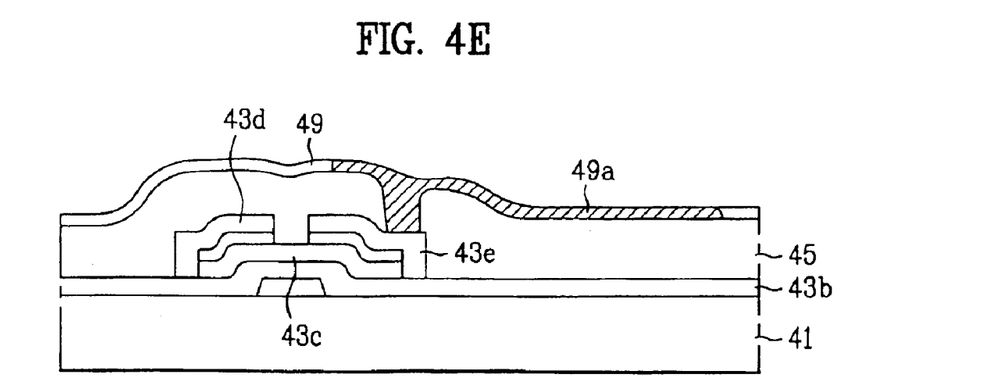

Referring now to FIG. 4E, the passivation layer 45 is then coated with an organic polymer 49 such that the organic polymer connects to the drain electrode 43e through the contact hole. An organic pixel electrode 49a is then formed by illuminating selected areas of the organic polymer 49. The illuminated areas become pixel electrodes.

Beneficially, an organic conductive layer is also formed by illuminating the organic polymer 49 over the gate and data pads. As a result, the gate pad electrically connects to the organic conductive layer, and the data pad electrically connects to the organic conductive layer.

The organic pixel electrode 49a and organic conductive layer have permeabilities over 75%, sheet resistance under $3\Omega/m^2$, and degree of planarization greater then 75% when the passivation layer 45 is organic.

In the illustrated embodiment the pixel electrode 49a and the organic conductive layers are beneficially comprised of PEDOT, an organic polymer material. Further, that PEDOT is formed on the substrate by general methods such as coating, screen printing, and the like.

Figure 5A:
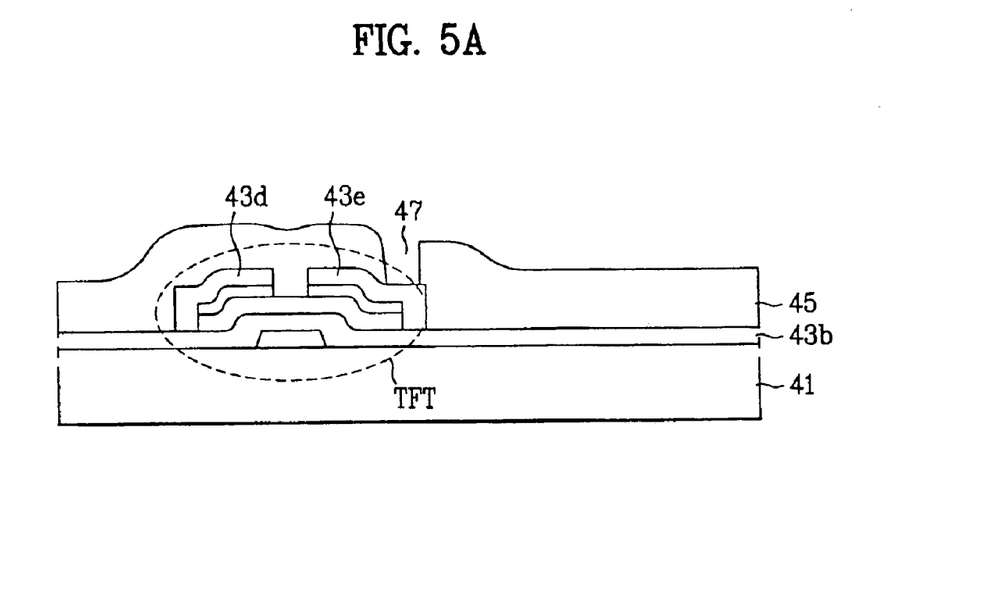
FIG. 5A to FIG. 5D show cross-sectional views when forming an organic pixel electrode according to a first embodiment of the present invention.
Figure 5B:
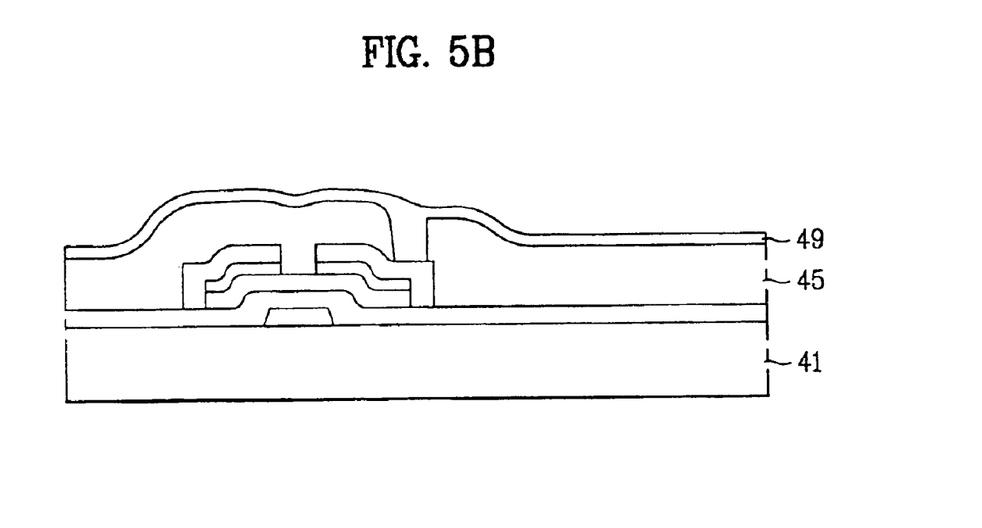
Figure 5C:
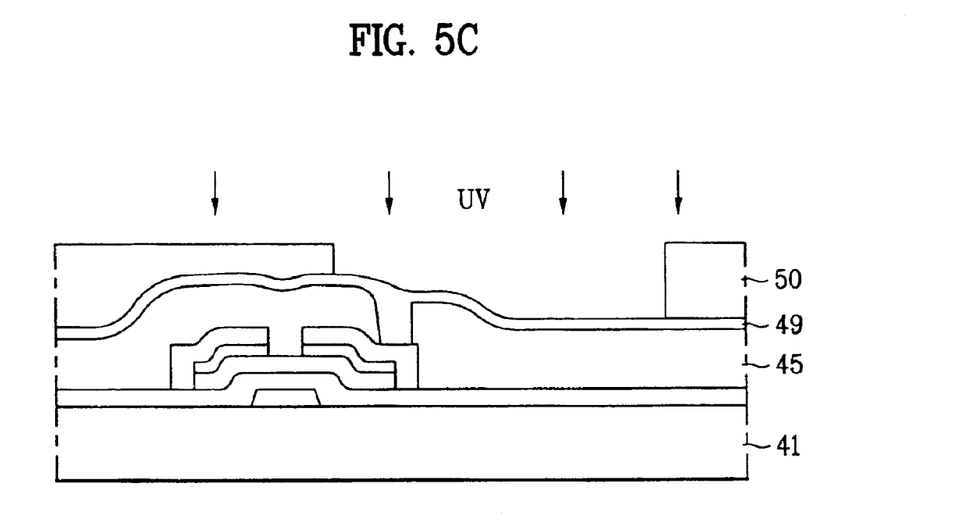
Figure 5D:
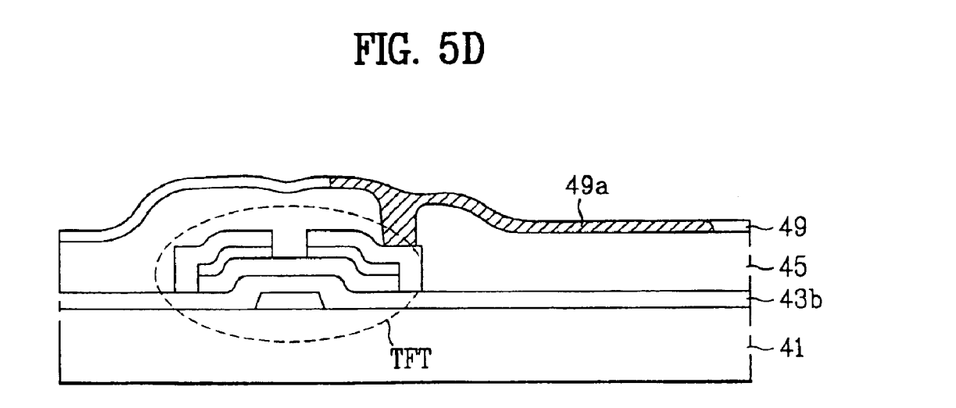
Figure 6A:
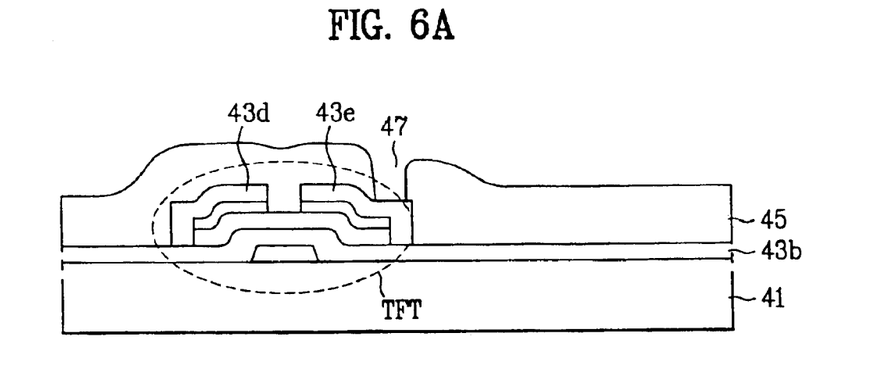
FIG. 6A to FIG. 6C show cross-sectional views when forming an organic pixel electrode according to a second embodiment of the present invention.
Figure 6B:
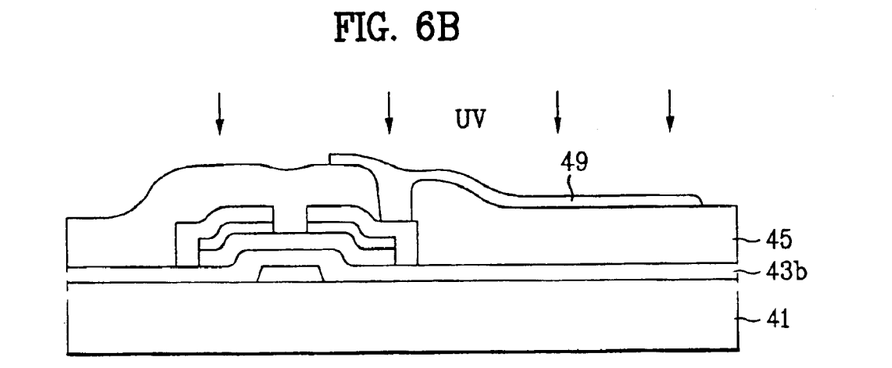
Figure 6C:
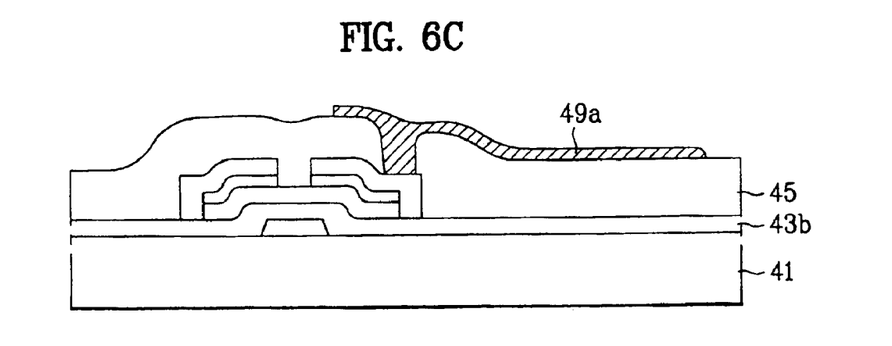

FIG. 5A to FIG. 5D show cross-sectional views when forming an organic pixel electrode according to a first embodiment of the present invention, while FIG. 6A to FIG. 6C show cross-sectional views when forming an organic pixel electrode according to a second embodiment of the present invention.

Referring now to FIG. 5A, after a passivation layer 45 has been formed, the contact hole 47 that exposes the drain electrode 43e is formed by patterning the passivation layer 45.

Referring now to FIG. 5B, the passivation layer 45, including the contact hole 47, is then coated with a film of PEDOT 49.

Referring to now FIG. 5C, light exposure is then carried out on selected areas of the PEDOT 49 film using a mask 50.

Referring now to FIG. 5D, the exposed areas of the PEDOT 49 become electrically conductive. Those conductive portions are used as organic pixel electrodes 49a.

A process of forming an organic pixel electrode by screen printing will now be explained. Referring to FIG. 6A, after a passivation layer 45 has been formed, a contact hole 47 that exposes the drain electrode 43e is formed by patterning the passivation layer 45.

Referring now to FIG. 6B, the passivation layer 45, including the contact hole 47, are then screen printed with PEDOT 49.

Referring now to FIG. 6C, the PEDOT film 49 is then illuminated with light to form organic pixel electrodes 49a.

Additionally, organic conductive layers on the pad part are also formed by the same methods used to form the organic pixel electrodes, beneficially simultaneously.

Photolithography is generally required to form related art ITO pixel electrodes. Pixel electrodes according to the present invention do not require photolithography, and thus damage to exposed metal layers when etching is avoided. Furthermore, the fabrication process is simplified. In particular, aluminum drain electrodes after etching ITO, can suffer from aluminum oxide($Al_2O_3$), which increase contact resistance. If chrome (Cr) is used, the surface of the chrome can be damaged during etching a passivation layer to form openings for the ITO.

In contrast, an organic pixel electrode 49a according to the principles of the present invention prevents the generation of metal oxides associated with ITO pixel electrodes.

Accordingly, a liquid crystal display device, and its fabricating method, according to the present invention has simplified process steps by eliminating a pixel electrode etch step. This eliminates damage to the gate lines and data lines caused by the etching. Additionally, forming a pixel electrode according to the principles of the present invention does not require a vacuum chamber. Furthermore, uniform cell gaps can be more easily achieved by the planarizing effects of the organic pixel electrodes. The result is a low cost, efficient process of producing liquid crystal displays with high yields.

The foregoing embodiments are merely exemplary and are not to be construed as limiting the present invention. The present teachings can be readily applied to other types of devices. The description of the present invention is intended to be illustrative, and not to limit the scope of the claims. Many alternatives, modifications, and variations will be apparent to those skilled in the art.

What is claimed is:

1. A liquid crystal display device, comprising:
    a first substrate;
    a second substrate adjacent the first substrate;
    a plurality of switching elements arranged on the first substrate;
    a gate pad and a data pad arranged on the first substrate;
    a plurality of organic pixel electrodes on the first substrate; and
    a liquid crystal layer interposed between the first and second substrates,
    wherein an organic conductive layer is on each of the gate and data pad.

2. The liquid crystal display device of claim 1, wherein the organic pixel electrodes include an organic polymer.

3. The liquid crystal display device of claim 2, wherein the organic polymer is PEDOT (polyethylenedioxythiophene).

4. The liquid crystal display device of claim 1, wherein the switching elements include thin film transistors.

5. The liquid crystal display device of claim 4, wherein the thin film transistors are amorphous silicon thin film transistors.

6. The liquid crystal display device of claim 1, wherein each switching element comprises:
   a gate electrode and a gate pad;
   a gate insulating layer over the gate electrode;
   a semiconductor layer on the gate insulating layer and over the gate electrode; and
   source and drain electrodes on the semiconductor layer,
   wherein an organic conductive layer is on the gate pad.

7. The liquid crystal display device of claim 6, wherein the organic pixel electrodes electrically connect to the drain electrodes.

8. The liquid crystal display device of claim 6, further comprising a passivation layer over the plurality of switching elements and over the first substrate.

9. The liquid crystal display device of claim 8, wherein the passivation layer includes an organic material.

10. The liquid crystal display device of claim 9, wherein the organic material includes BCB.

11. The liquid crystal display device of claim 9, wherein the organic material includes acryl.

12. The liquid crystal display device of claim 8, wherein the passivation layer includes an inorganic material.

13. A liquid crystal display device including a thin film transistor substrate, wherein the thin film transistor substrate comprises:
   a substrate having an active area and a pad area;
   a gate line and a crossing data line;
   a thin film transistor at a crossing between the gate and data lines;
   a passivation layer over the thin film transistor, wherein the passivation layer includes a contact hole;
   an organic pixel electrode formed in the active area, wherein the organic pixel electrode connects to the thin film transistor through the contact hole; and
   an organic conductive layer of the pad area.

14. The liquid crystal display device of claim 13, wherein the organic pixel electrode includes an organic polymer.

15. The liquid crystal display device of claim 14, wherein the organic polymer is PEDOT (polyethylenedioxythiophene).

16. The liquid crystal display device of claim 14, wherein the organic pixel electrode is electrically-conductive.

17. The liquid crystal display device of claim 14, wherein the organic pixel electrode is in an area bounded by gate and data lines.

* * * * *